(12) United States Patent
Chow et al.

(10) Patent No.: US 6,582,673 B1
(45) Date of Patent: Jun. 24, 2003

(54) CARBON NANOTUBE WITH A GRAPHITIC OUTER LAYER: PROCESS AND APPLICATION

(75) Inventors: Lee Chow, Orlando, FL (US); Dan Zhou, Orlando, FL (US); Stephen Kleckley, Orlando, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/528,259

(22) Filed: Mar. 17, 2000

(51) Int. Cl.$^7$ .............. C01B 31/04; B32B 5/16
(52) U.S. Cl. .............. 423/445 R; 423/445 B; 423/448; 423/460; 428/403
(58) Field of Search ............. 428/403; 423/445 R, 423/448, 460, 445 B, DIG. 39

(56) References Cited

U.S. PATENT DOCUMENTS

| | | | |
|---|---|---|---|
| 4,025,689 A | 5/1977 | Kobayashi | 428/402 |
| 4,228,142 A | 10/1980 | Holcombe, Jr. | 423/449 |
| 4,855,091 A | 8/1989 | Geus | 264/22 |
| 5,165,909 A | 11/1992 | Tennent | 423/447 |
| 5,346,683 A | 9/1994 | Green | 423/447 |
| 5,456,986 A | 10/1995 | Majetich | 428/403 |
| 5,543,378 A | 8/1996 | Wang | 502/174 |
| 5,560,898 A | 10/1996 | Uchida | 423/461 |
| 5,641,466 A | 6/1997 | Ebbesen | 423/447.2 |
| 5,698,175 A | 12/1997 | Hiura | 423/447.1 |
| 5,747,161 A | 5/1998 | Iljima | 428/367 |
| 5,780,101 A | 7/1998 | Nolan | 427/216 |
| 5,965,267 A | 10/1999 | Nolan | 428/408 |
| 6,159,538 A * | 12/2000 | Rodriguez et al. | 427/213.31 |
| 6,331,209 B1 * | 12/2001 | Jang et al. | 427/249.1 |
| 6,350,488 B1 * | 2/2002 | Lee et al. | 427/249.1 |
| 6,413,487 B1 * | 7/2002 | Resasco et al. | 423/447.3 |
| 6,455,021 B1 * | 9/2002 | Saito | 423/447.3 |
| 6,479,028 B1 * | 11/2002 | Kaner et al. | 423/414 |

\* cited by examiner

*Primary Examiner*—H. Thi Le
(74) *Attorney, Agent, or Firm*—Brian S. Steinberger; Law Offices of Brian S. Steinberger, P.A.

(57) ABSTRACT

A method for manufacturing carbon nanotubes with an integrally attached outer graphitic layer is disclosed. The graphitic layer improves the ability to handle and manipulate the nanometer size nanotube device in various applications, such as a probe tip in scanning probe microscopes and optical microscopes, or as an electron emitting device. A thermal chemical vapor deposition reactor is the preferred reaction vessel in which a transition metal catalyst with an inert gas, hydrogen gas and a carbon-containing gas mixture are heated at various temperatures in a range between 500° C. and 1000° C. with gases and temperatures being adjusted periodically during the reaction times required to grow the nanotube core and subsequently grow the desired outer graphitic layer.

14 Claims, 7 Drawing Sheets

ALL CARBON NANOPROBE --------- PROCESS PERAMETERS

|  | STEP 1 | STEP 2 | STEP 3 | STEP 4 |
|---|---|---|---|---|
| GAS COMPOSITION | 50% $H_2$ 50% Ar | 10% $CH_4$ 90% Ar | 5% $CH_4$ 95% OF Ar/$H_2$ | 10% $CH_4$ 90% Ar |
| TEMPERATURE RANGE | 500° C- 750° C | 750° C- 900° C | 900° C- 1000° C | 1000° C |
| PROCESS | PURGING; REDUCTION | NANOTUBE GROWTH | AMORPHOUS CARBON GROWTH | GRAPHITIC LAYER GROWTH |
| DURATION | 30 - 45 MIN. | 30 - 45 MIN. | 30 - 45 MIN. | 30 - 60 MIN. |

FIG. 5

CARBON NANOTUBE WITH A GRAPHITIC OUTER LAYER: PROCESS AND APPLICATION

The present invention relates to a novel method of manufacturing carbon nanotubes, and in particular to the production of a structure comprising a carbon nanotube with an outer graphitic layer that can function as a handle for attaching and/or manipulating the tip of the nanotube.

BACKGROUND AND PRIOR ART

Material scientists have been exploring the properties of fullerenes which are geometric structures built of carbon atoms. In 1991, a new fullerene joined the buckyball, a cage-like structure built of 60 carbon atoms. Scientists found that the buckyball structure can be extended to form long slender tubes—carbon nanotubes—single molecules comprised of rolled graphene (graphite-like) sheets capped at each end. Thus, carbon nanotubes, the newest fullerene structure, are effectively buckyballs played out as long strands, so thin they can not be seen under an ordinary microscope and certainly not with the naked eye. In fact, it is suggested by Boris I. Yakobson and Richard E. Smalley in *American Scientist* (July–August 1997), "Fullerene Nanotubes: $C_{1,000,000}$ and Beyond," that when Roger Bacon used the electric arc in the early 1960s to make "thick" carbon whiskers, the nanotube discovery was a matter of looking more closely at the smallest products hidden in the soot, but Bacon lacked the high-power microscope required to see them.

To comprehend the size of a single-wall carbon nanotube, imagine holding in your hand a wand with a hollow core that is a single molecule. Such a wand would be a few atoms in circumference. In fact, nanotubes sufficient to span the 250,000 miles between the earth to the moon could be loosely rolled into a ball the size of a poppyseed. Together, the smallness of the nanotubes and the chemical properties of carbon atoms packed along their walls in a honeycomb pattern are responsible for their fascinating and useful qualities and, present significant production challenges.

Precursors to the development of carbon nanotubes are reported in patents issued prior to 1991. U.S. Pat. No. 4,025,689 discloses a process requiring the use of inert gas and temperatures up to 3000° C. for preparing a lightweight, hollow carbon body having outstanding properties as activated carbon. U.S. Pat. No. 4,228,142 prepares a high density carbon coated silicon carbide particle which can be substituted for commercial-grade diamonds by reacting a fluorocarbon and silicon carbide in an inert gas atmosphere at temperatures >800° C. U.S. Pat. No. 4,855,091 discloses the formation of a fishbone-like graphite layer along an axis of carbon filaments when a carbon containing gas is heated to temperatures between 250° C. and 800° C. in the presence of ferromagnetic metal particles. U.S. Pat. No. 5,165,909 discloses the growth of hollow carbon fibrils having layers and a core made up of concentric rings, like a tree. Metal-containing particles are used as catalysts in reactions with inexpensive, readily available carbon containing raw materials; high temperature graphitizing reactions are avoided. The fibrils have a high surface area, high tensile strength and modulus required in reinforcement applications. U.S. Pat. No. 5,747,161 discloses a method for forming a tubular shaped carbon filament less than 30 nanometers in diameter using an arc discharge process.

In summary, the pursuit of carbon structures is well documented and the foundation is laid for the use of processes employing inert gas atmospheres, metal catalysts having an affinity for carbon such as iron, nickel, cobalt (Fe, Ni, Co, respectively) and high temperatures to create the desired structure.

After the discovery of carbon nanotubes in 1991, scientific efforts have been devoted to the production of carbon nanotubes in higher yield; the production of carbon nanotubes with consistent dimensions, e.g., diameter and length; processes which separate nanotubes from other reaction products; processes which eliminate the entanglement of tubes with each other and the development of useful applications. For example, U.S. Pat. No. 5,346,683 discloses uncapping and thinning carbon nanotubes to provide open compartments for inserting chemicals. U.S. Pat. No. 5,456,986 discusses the production of magnetic nanoparticles and nanotubes from graphite rods packed with magnetic metal oxides or rare earths and subjected to carbon arc discharge. U.S. Pat. No. 5,543,378 discloses carbon nanostructures which encapsulate a palladium crystallite, allowing the delivery of substances suitable for x-ray diagnostic imaging in a safe, encapsulated form. Another method of producing encapsulated nanoparticles, nanotubes and other closed carbon structures is disclosed in U.S. Pat. No. 5,780,101 and its divisional counterpart, U.S. Pat. No. 5,965,267; a transition metal catalyst is contacted with a gas mixture containing carbon monoxide in a temperature range between 300° C. and 1000° C. Methods for isolating and increasing the yield of carbon nanotubes are disclosed in U.S. Pat. No. 5,560,898 which discusses a physical separation technique; U.S. Pat. No. 5,641,466 reveals a method for purification of carbon nanotubes by the oxidation of co-existing, but undesired carbon structures; and U.S. Pat. No. 5,698,175 claims a chemical technique for separating nanotubes from carbon by-products.

The references reveal that prior art methods for producing carbon nanotubes give undesirably low yields. Carbon nanotubes with significant variations in'structure and size are usually produced and often include carbon materials of different shapes which may be carbon nanoparticles and amorphous carbon. Carbon nanotubes are further classified into one with a single hexagonal mesh tube called a single-walled nanotube (abbreviated as "SWNT"), and one comprising a tube of a plurality of layers of hexagonal meshes called a multiwalled nanotube (abbreviated as "MWNT").

The type of carbon nanotube structure available is determined to some extent by the method of synthesis, catalysts and other conditions. Research continues in an effort to produce carbon nanotubes of a consistent, predictable structure.

The present invention contributes a more consistent, predictable method for manufacturing a particular configuration of carbon nanotubes. Novel process conditions and reactants are disclosed. The present invention also provides a solution to problems associated with handling and manipulating the "small" wand which is only visible with high-power electron microscopes, or other costly visual aids. Through the process of the present invention, a "graphic outer layer" defined as carbon material comprising one or more distinct structures, is intentionally formed during carbon nanotube production and becomes an integral part of the carbon nanotube device. The carbon material can be either a soft amorphous carbon, a hard graphitic carbon, or a combination thereof. If the soft amorphous carbon is formed prior to the formation of the harder, more resilient graphitic carbon, the amorphous carbon serves as a cushion between the carbon nanotube and the harder graphitic carbon. The carbon material, either singly or collectively, is called the "graphitic outer layer" and creates bulk such that the sub-microscopic nanotube can be handled easily and efficiently.

Computer simulations and laboratory experiments show that carbon nanotubes have extraordinary resilience, strength and various unusual electronic and mechanical properties; for instance, they can be formed into very strong ropes and can be used as probes because of a very large Young's modulus, even greater than diamond. They also exhibit electrical conductivity in a quantized fashion that has led to experiments with tiny nanowires and nanoscale transistors.

SUMMARY OF THE INVENTION

The first objective of the present invention is to provide a method for producing a new configuration for multi-walled carbon nanotubes that enhances utility. The same procedure can be used to produce a similar configuration for single-walled carbon nanotubes with appropriate modifications to process conditions.

The second objective of the present invention is to provide a method for handling this new carbon nanotube configuration on the tip of a scanning probe microscope.

The third objective of this invention is to demonstrate the use of the new carbon nanotube configuration as an excellent electron source.

The fourth objective of this invention is to provide a graphitic carbon handle on a carbon nanotube to enable manipulation of the nanotube probe tip using the power of a conventional optical microscope.

The preferred embodiment for the production of carbon nanotubes in the present invention results in nanotubes having a diameter between about 1 nanometer (nm) and about 100 nm with an integrally attached outer layer of graphitic material approximately 1 micrometer ($\mu$m) to approximately 10 $\mu$m in diameter. The much larger diameter of the graphitic outer layer becomes a handle so that the nanotube probe can be manipulated under a conventional optical microscope. The handle also provides a means for attachment and greatly enhances the utility of carbon nanotubes in a variety of scanning probe microscopes, electron microscopes and on a substrate as an electron emitter for flat panel displays.

Further objectives and advantages of this invention will be apparent from the following detailed description of a presently preferred embodiment which is illustrated in the accompanying drawings.

BRIEF DESCRIPTION OF THE FIGURES

FIG. 5 is a chart of process conditions used to produce a nanotube with various graphitic outer layers.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
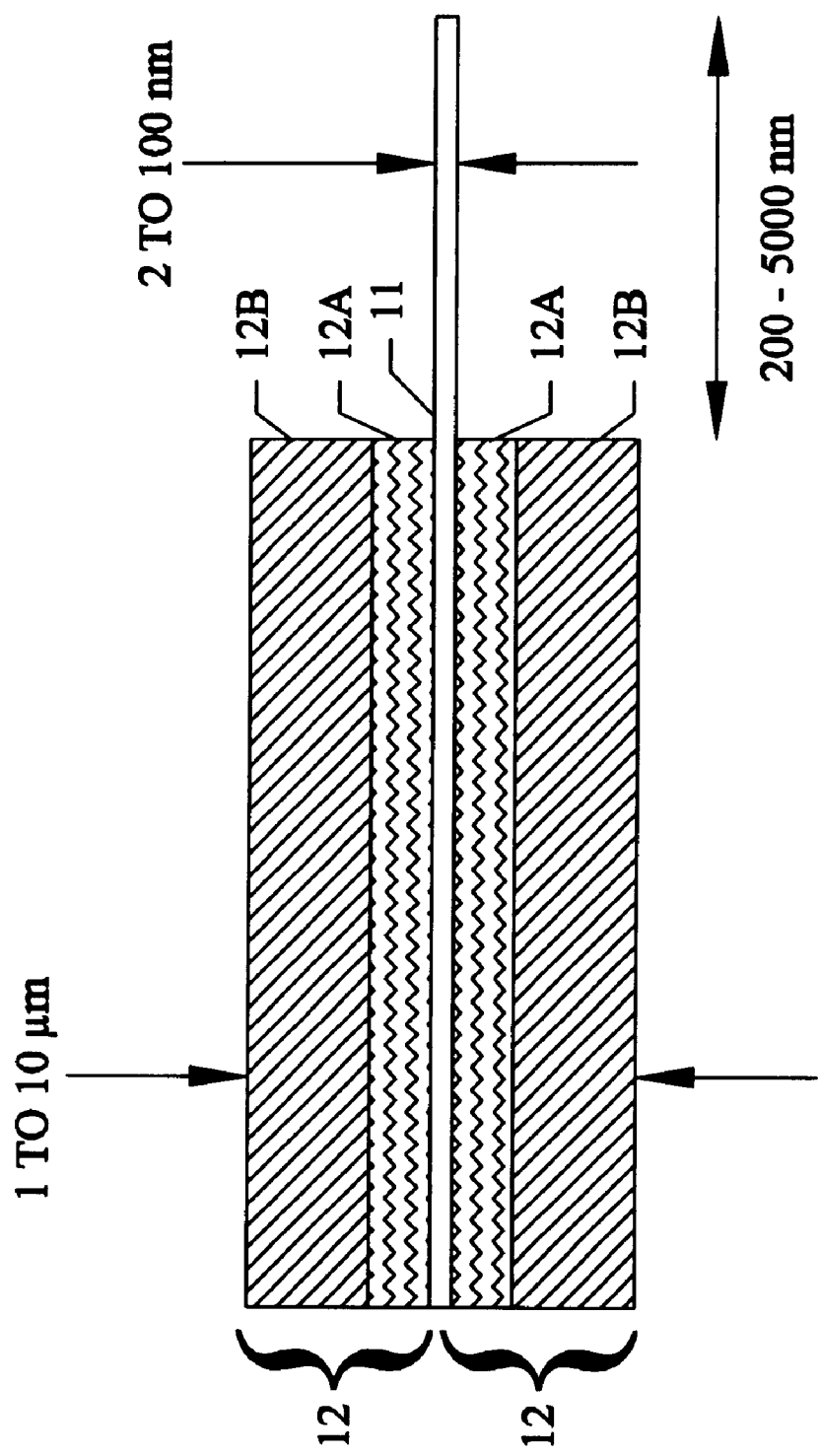
FIG. 1 is a diagram of a carbon nanotube with a graphitic outer layer—amorphous carbon coated with graphitic carbon.

The present invention produces a new carbon nanotube device as shown in FIG. 1. The carbon nanotube (11) is initially grown in a catalytic chemical vapor deposition process(CVD) produced in an early phase of the manufacturing process and with adjustments in reaction conditions, the graphitic outer layer (12) having a diameter from approximately 1 micrometer ($\mu$m) to approximately 10 micrometers grows on the outside of the nanotube. What is surprising and not expected is that by judiciously selecting reaction conditions and reactants, carbon nanotubes are produced with one or more distinctive carbon or graphitic structures integrally attached. For example, after the growth of the nanotube (11) at specific process parameters, the gaseous mixture in the reactor is changed to include hydrogen gas, and the reaction temperature is increased to approximately 900° C. to support the growth of an amorphous carbon layer (12a) onto the nanotube. Note that this amorphous layer (12a) is soft and easily broken away from the nanotube core. A subsequent change in the gaseous mixture to eliminate the hydrogen gas while maintaining the reaction temperature at approximately 1000° C., result in a deposition of a graphitic carbon layer (12b) to grow onto the amorphous layer (12a). The graphitic carbon layer (12b) is harder than the amorphous carbon layer (12a); therefore, the graphitic carbon layer (12b) is preferred as a handle for the nanotube core. It is also possible to grow the nanotube core (11) and change process conditions so that the amorphous carbon layer (12a) is omitted and the harder graphitic carbon layer (12b) grows as the only outer layer on the nanotube core. If the softer amorphous carbon layer is preferred, the process conditions can be adjusted or stopped after the amorphorus layer is formed, so that the harder graphitic carbon layer does not form.

Figure 2:
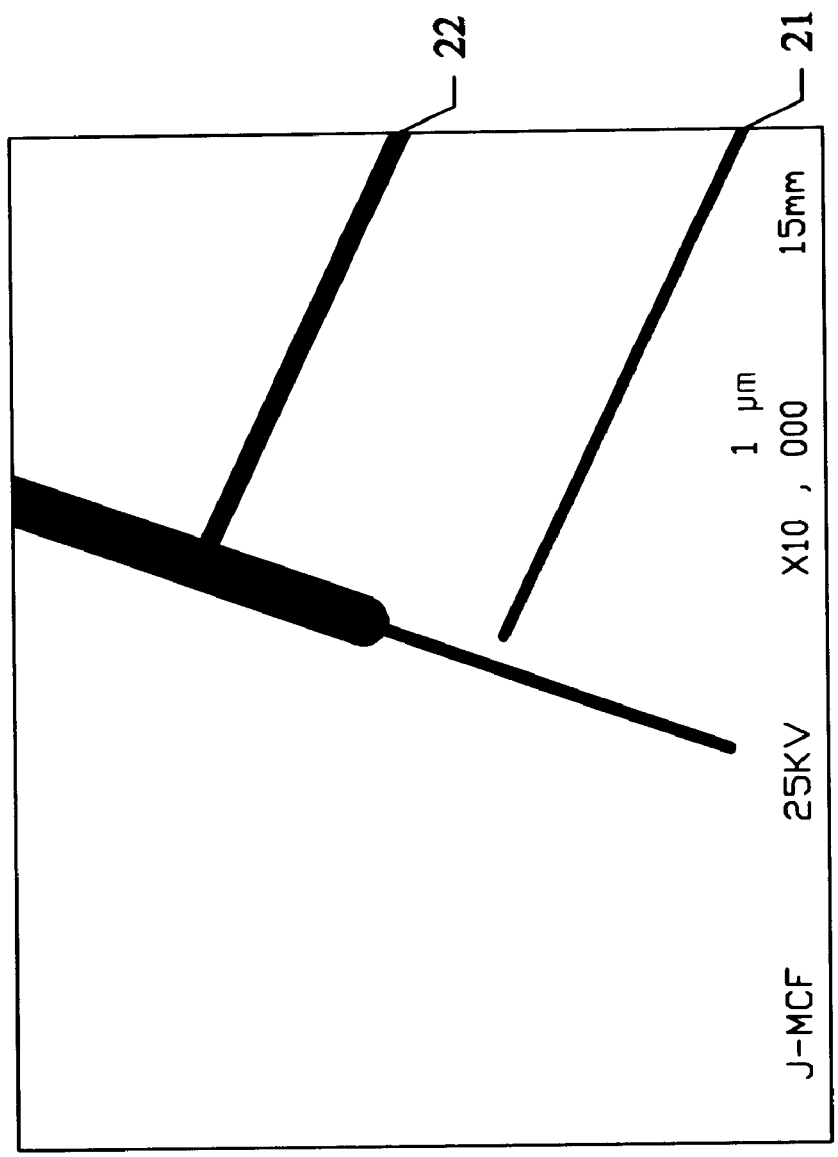
FIG. 2 is a scanning electron micrograph of a nanotube with a graphitic outer layer.

FIG. 2 shows the scanning electron micrograph of the new carbon nanotube device after a portion of the graphitic material (22) has been mechanically removed from the nanotube core (21).

The outer graphitic layer serves several purposes. For example, it provides a mechanical coupling between the nanotube and the probe tip when used as a tip for scanning probe microscopes (SPM). SPM include a variety of proximity probe microscopes, for example: scanning tunneling microscope (STM). atomic force microscope (AFM), magnetic force microscope (MFM), scanning capacitance microscope (SCM) and the like.

Figure 3A:
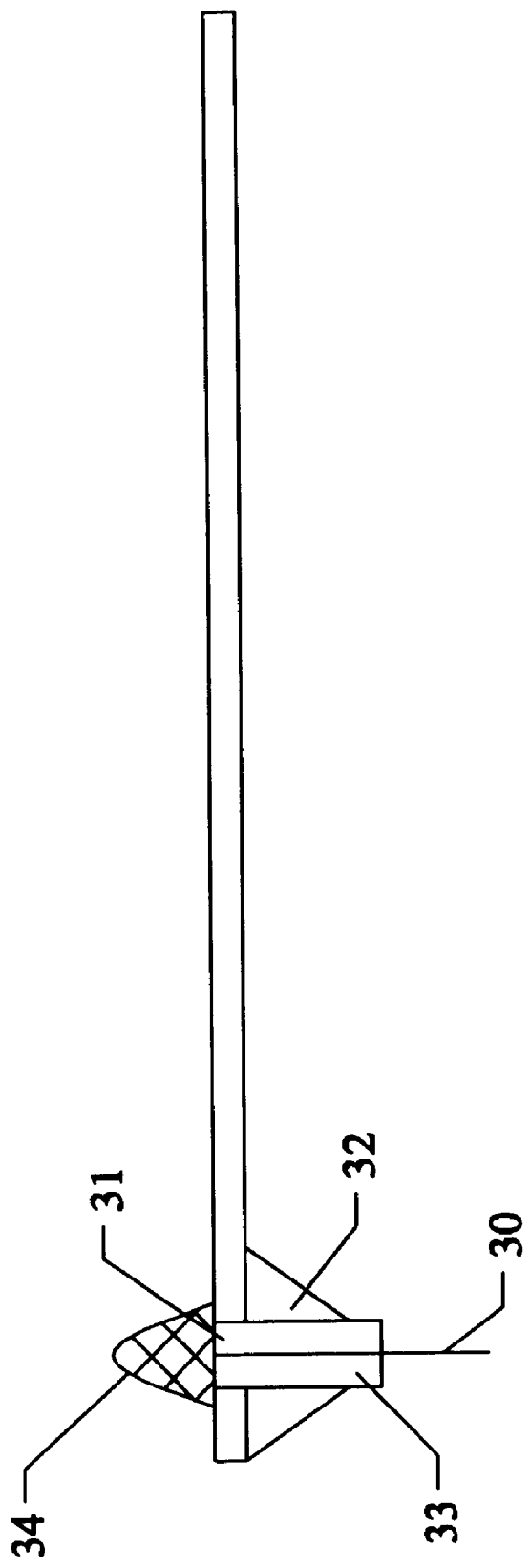
FIG. 3A is a carbon nanotube probe mounted on a conventional atomic force microscope tip.

A conventional atomic force microscope (AFM) tip arrangement is shown in FIG. 3A. Prior to the present invention, the pyramid tip of a standard AFM was typically made out of silicon nitride ($Si_3 N_4$) and can be used in contact mode with atomic resolution. However, the silicon nitride pyramid-tip scanning probe microscope can not meet the requirements of the semiconductor industry where a deep narrow trench of approximately 200 nm width and 500 nm depth is to be scanned. The current state of the art technique reaches it limit with the production of an etched optical fiber tip with a diameter of about 200 nm. As the components in the semiconductor industry become smaller and smaller, it is necessary to use the product of the present invention to meet the metrology requirements. The graphitic material, acting as a handle, provides a means for attaching the nanotube to the tip of the AFM.

In FIG. 3A, the nanometer size nanotube (30) is mounted to a conventional cantilever by using a laser or focus ion beam to drill a hole (31) approximately 1 micrometer to approximately 10 micrometers ($\mu$m) in diameter in the conventional cantilever pyramid tip (32). The nanotube with graphitic outer layer (33) is inserted in the hole. The nanotube (30) and the graphitic outer layer (33) are collectively sometimes called a "nanoprobe." A small amount of adhesive (34) is applied to firmly fix the nanoprobe in the pyramid tip (32) of a conventional AFM. Other means for affixing the nanoprobe to the scanning probe tip may be used and are understood to be within the scope of the present invention.

Figure 3B:
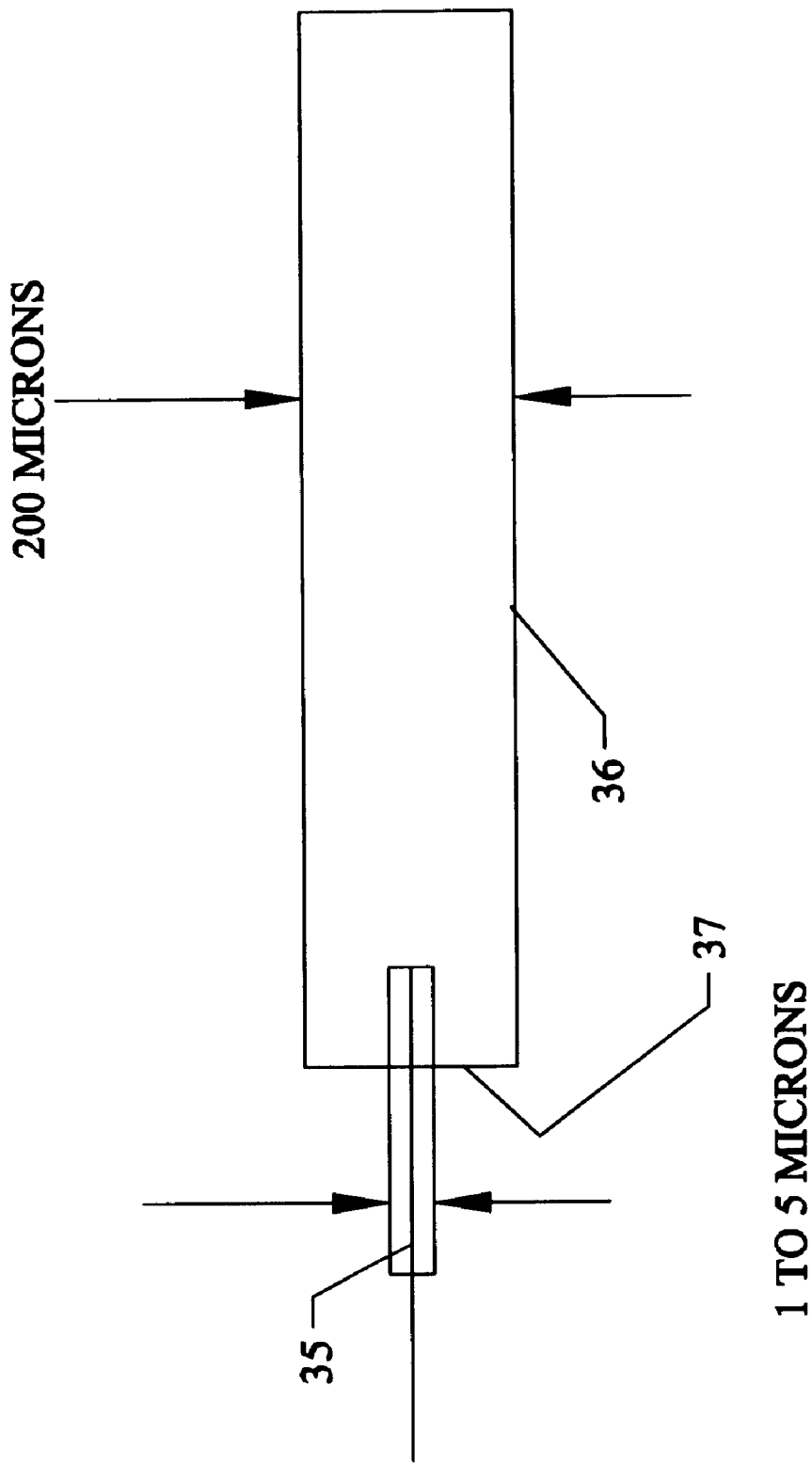
FIG. 3B is a carbon nanotube probe mounted on the end of an optical fiber.

FIG. 3B shows a nanoprobe (35) mounted on the end of an optical fiber (36). In this embodiment, a hole (37) that is approximately 1 $\mu$m to approximately 5 $\mu$m in diameter is drilled at the end of an optical fiber (36). The depth of the hole can be from approximately 10 microns to approximately 1000 microns. A small amount of adhesive is applied to the surface interface between the nanoprobe and the hole drilled in the optical fiber.

Another purpose served by the graphitic outer layer is to provide a means for the carbon nanotube to be manipulated under an optical microscope. In other applications, such as an electron emitter for the field emission electron microscope or for arranging an array of nanotubes on a silicon substrate used in flat panel displays, the manipulation and arrangement of the nanotubes are facilitated by the graphitic outer layer.

Figure 4:
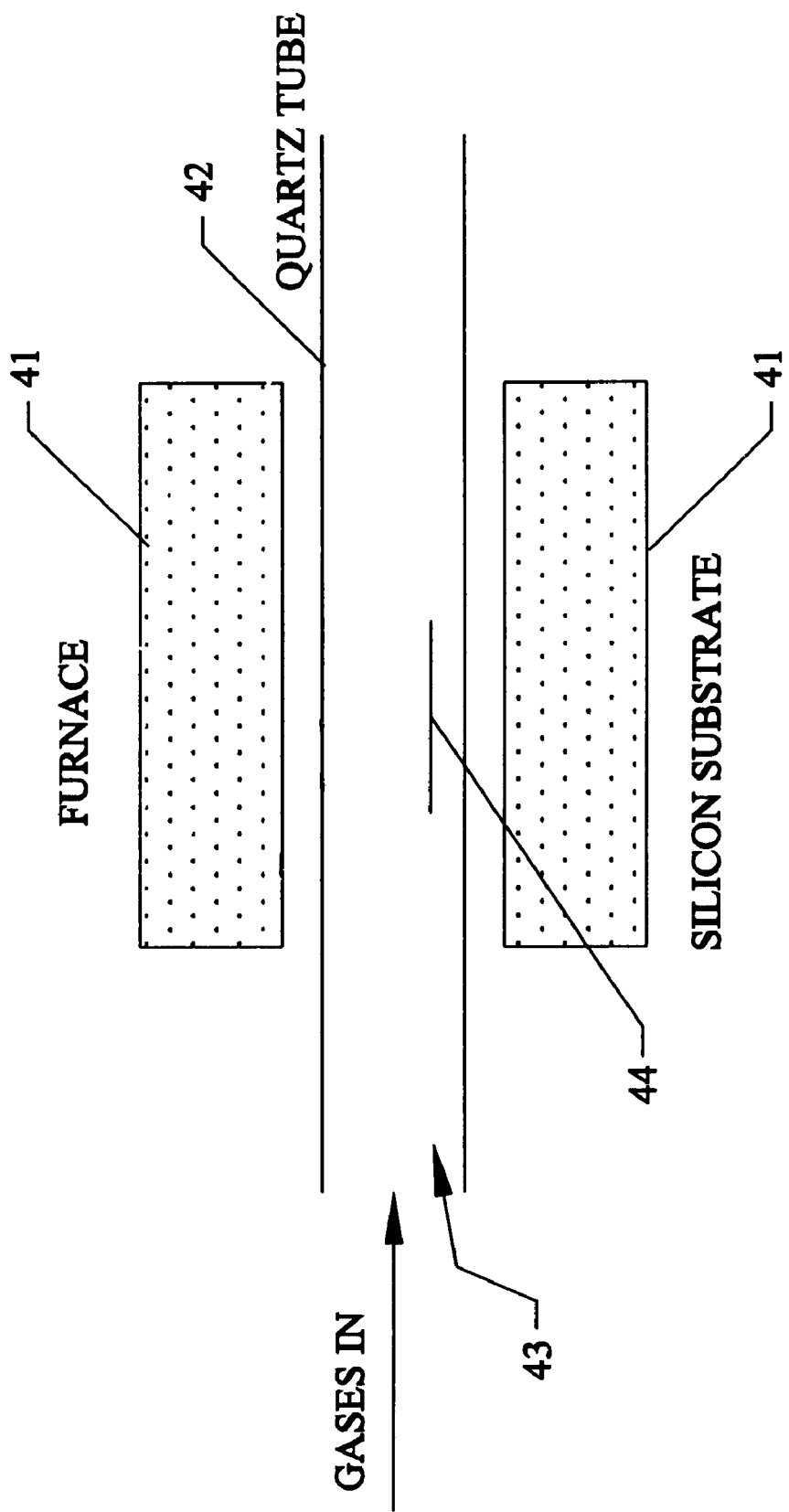
FIG. 4 is a diagram of a thermal chemical vapor deposition reactor for the production of a nanotube with a graphitic outer layer.
Figure 6:
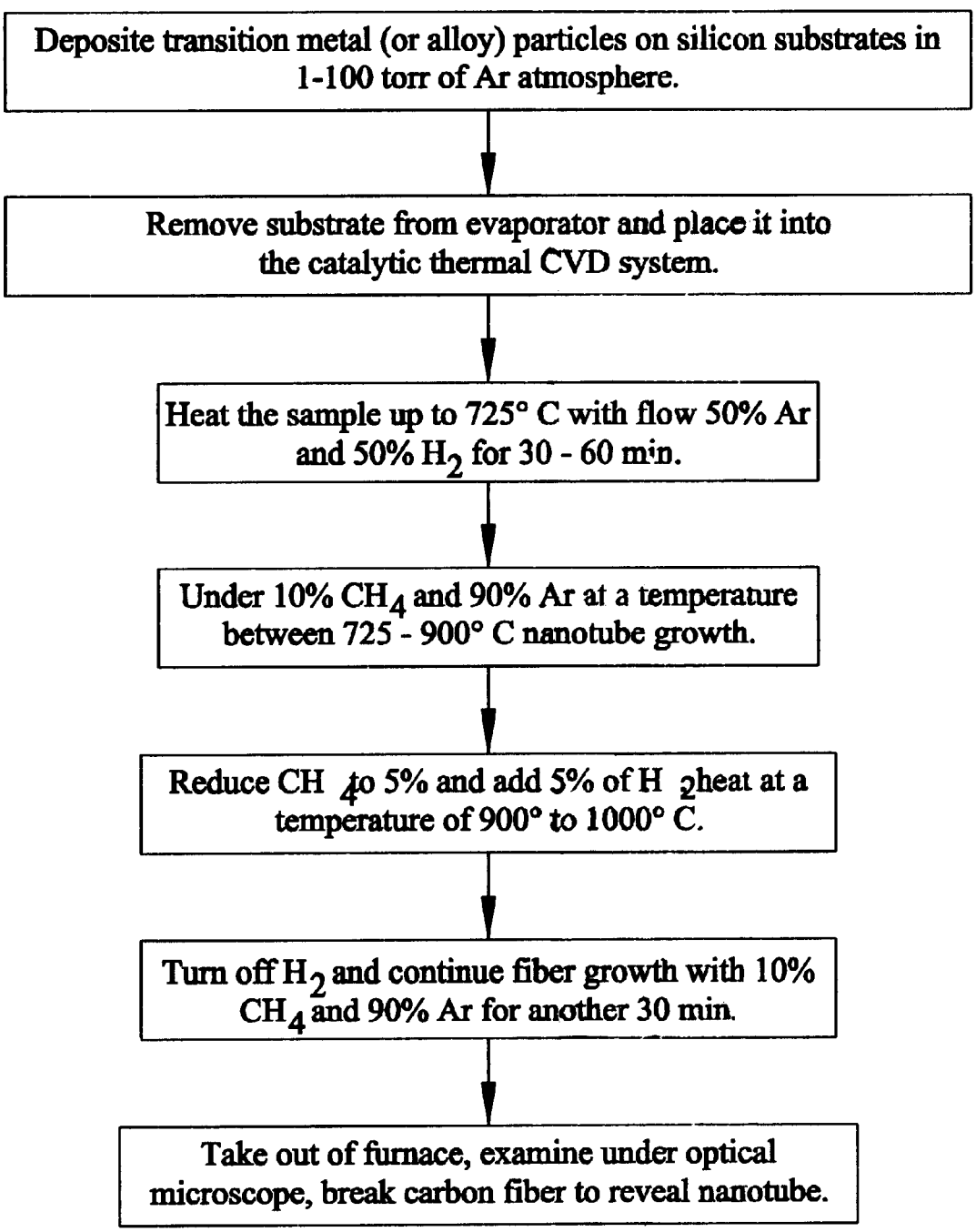
FIG. 6 is a flow diagram of process steps for production of nanotubes in the preferred embodiment.

The method for manufacturing the unique carbon nanotube device of the present invention will now be described in detail. The configuration shown in FIG. 4 is generally known as a thermal chemical vapor deposition (CVD) reactor which is the preferred device for production. FIG. 5 charts the nanotube device manufacturing process parameters. FIG. 6 is a flow chart of the manufacturing method used in the Example which illustrates the invention.

FIG. 4 is a diagram of the quartz tube reactor comprising a furnace (41) a quartz tube (42) with an inlet means for gases (43) and an internal position for the catalytic metal substrate (44). Quartz tube reactors are commercially available and known to those skilled in the art. The reactor used in the present invention was supplied by Lingberg-Blue M, 304 Park Street, Watertown, Wis. 53004. Reaction conditions are shown in FIG. 5.

Preparation for the manufacture of the carbon nanotube device begins with the deposition of transition metal or transition metal alloy particles on a silicon substrate in 1–100 Torr of an inert gas atmosphere. Substrates can be used that do not react with the carbon-containing raw material gas at high temperatures or do not contain the catalysts selected for the present process. The transition metal catalyst (pure element or alloy) can be selected from the group consisting of cobalt, nickel or iron (Co, Ni or Fe, respectively), or mixtures thereof which can be deposited as nanoparticles on silicon. The presence of a catalyst also allows the use of a lower reaction temperature.

Thus, the reaction temperatures may vary with choice and amount of catalysts employed. Temperature ranges for various reactions in the present invention are disclosed in FIG. 5. Purging of the reaction vessel occurs between approximately 500° C. and approximately 750° C. Nanotube growth occurs between approximately 750° C. and approximately 900° C. Amorphous carbon forms a soft outer coating of the nanotube at temperatures between approximately 900° C. and approximately 1000° C. Graphitic carbon forms a hard outer coating on either the nanotube or the amorphous carbon at a temperature of approximately 1000° C.

The inert gas atmosphere is effective when the growth rate is too high, or when alleviating toxicity or explosivity of the raw material gas. The inert gases useful in the present invention include such gases as argon, helium and nitrogen; argon being preferred. As one skilled in the art would understand, process conditions can vary based on the selection of gases. The silicon substrate with catalyst is placed inside the quartz tube reactor. Then a mixture of hydrogen gas and argon gas is passed through the reactor while the tube is being heated to 750° C. using a resistivity tube furnace. The ratio of hydrogen gas to argon gas is 1:1. The temperature of the furnace is measured with a thermocouple probe. This phase of the reaction is shown in FIG. 5 as Step 1. In Step 1, catalyst reduction and purging of impurities in the vessel are accomplished.

In Step 2 of FIG. 5, carbon nanotube growth occurs when the gases fed to the reaction vessel are changed to a mixture of a carbon-containing raw material gas and an inert gas while the temperature is increased to 900° C. The ratio of raw material gas to inert gas is 1:10. Theoretically, any carbon containing gas can be used as a raw material for the present process. Preferably the carbon-containing raw material gas is a hydrocarbon such as methane, ethane, propane, butane, hexane, cyclohexane or an oxide such as carbon monoxide. To reiterate, process conditions may require adjustment with changes in the raw materials used. The ratio of raw material gas to inert gas, should preferably be within a range of from approximately 1:20 to approximately 20:1. The better results are from experiments with a ratio of 1:20 to approximately 1:10. At lower ratios, the nanotubes are thinner and in a preferred structural arrangement. A carbon nanotube is generated in a period of time within a range of from 30 minutes to 1 hour after the introduction of the raw material gas.

Step 3 in FIG. 5 shows a change in ratio of raw material gas to inert gas, with the addition of hydrogen gas, so that there are equal amounts of hydrogen and carbon-containing raw material gas (methane). During this step the temperature of the vessel is increased to approximately 1000° C. Under this processing condition, the formation and growth of carbon nanotubes is stopped, and a layer of amorphous carbon is deposited on the surface of the carbon nanotubes in a period of time that ranges of from approximately 30 minutes to approximately 45 minutes or one hour after the gaseous mixture is adjusted to a lower composition of raw material gas.

Step 4 in FIG. 5 shows the third and final adjustment of gases being fed into the reactor tube. Hydrogen gas is turned off and the ratio of carbon-containing raw material gas to inert gas is again in a preferred ratio of 1:10. The temperature of the reactor is maintained at approximately 1000° C. for a period of time from approximately 30 minutes to approximately 45 minutes. By applying this processing condition, a hard graphitic layer has been coated onto the soft amorphous carbon layer which is deposited on the surface of the carbon nanotubes. A novel configuration of multi-walled carbon nanotube core with a soft amorphous carbon layer and a hard graphite layer coating is achieved. Furthermore, annealing of the carbon nanotube device also occurs in the final step of the reaction.

For carbon nanotube production and growth of a graphitic outer layer, the pressure within the reactor is one atmosphere. The gas flow rate is 100 to 200 cubic centimeters per minute.

The present invention is shown in further detail in FIG. 6 and described in the following example.

EXAMPLE 50 milligrams (mg) of FeNi nanoparticles, comprising a 1:1 ratio of Fe and Ni, are deposited on a silicon substrate having a surface area of approximately 300 $cm^2$ in 50–100 Torr argon atmosphere. The FeNi transition metal catalyst on silicon substrate is removed from the evaporator and placed in a thermal catalytic vapor deposition (CVD) system consisting of a quartz tube inserted into a furnace.

The reactor vessel is heated to approximately 725° C. with a flow of 50% argon and 50% hydrogen for 30 to 60 minutes. This purges the vessel of undesirable impurities and reduces oxides. Next, a gas flow comprising 10% methane ($CH_4$) and 90% argon (Ar), is introduced to the reactor at a temperature between approximately 725° C. and 900° C. for a period of thirty minutes to forty-five minutes for nanotube growth. Then the gaseous mixture being fed to the reactor vessel is changed to 5% methane, 5% hydrogen ($H_2$) and 90% argon while the reactor is heated to temperatures between 900° C. and 1000° C. and maintained at this temperature range for a period of approximately thirty minutes to approximately forty-five minutes. During this period, the growth of carbon nanotubes has been terminated, and a soft amorphous carbon coating forms on the carbon nanotube core.

Hydrogen gas is turned off and graphitic carbon outer layer growth continues with gas flow comprising 10% $CH_4$ and 90% Ar and the maintenance of the reactor at a temperature of approximately 1000° C. for an additional thirty minutes to sixty minutes. During this period instead of the deposition of amorphous carbon, a hard graphitic layer forms on the amorphous carbon covering the nanotube core. The reaction product is removed from the reactor vessel, allowed to cool then examined under an optical microscope. The outer graphitic layer is broken away by a physical means to reveal the strong, resilient nanotube core which is highly resistant to breaking.

In another embodiment, when referring to FIG. 5, the process could omit step 4 and produce a carbon nanotube with a soft amorphous carbon outer layer. Or, if step 3 is omitted, the outer layer would be the harder graphitic carbon. Either singly or collectively, the carbonaceous material intentionally formed on the outside of the nanotube core is called the graphitic outer layer.

FIG. 6 is a flow diagram of the process steps for production of nanotubes in the preferred embodiment. In step 110, the transition metal(or alloy) particles can be deposited on silicon substrates in 1–100 torr of Ar atmosphere. Next, in step 120, the substrate can be removed from the evaporator and placed into the catalytic thermal CVD(chemical vapor deposition) system. Steps 110 and 120 are further described in reference to FIG. 4 above. In step 130, the sample can be heated up to 725 C. having a flow of 50% Ar and 50% $H_2$ for 30–60 minutes. In step 140, nanotube growth 11 shown in FIG. 1 can occur under 10% $CH_4$ and 90% argon at a temperature between 725–900 degrees C. In step 150, an armorphous layer 12a shown in FIG. 1 starts growing when $CH_4$ is reduced to 5% and 5% of $H_2$ heat is added at a temperature of 900 to 1000C. In step 160, $H_2$ can be turned off and a graphitic carbon layer 12b as shown in FIG. 1 is a continued fiber growth that occurs with 10% $CH_4$ and 90% of Argon for another 30 minutes. Finally, in step 170, a new carbon nanotube device as depicted in FIG. 1 can be taken out of a furnace, examined under a microscope, and can be broken as previously described to reveal a nanotube 11 (See FIG. 2).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for manufacturing a carbon nanotube device consisting of a carbon nanotube core having an integrally attached outer graphitic layer comprising the steps of:

a) preparing a transition metal catalyst on a selected substrate;

b) placing the transition metal catalyst and substrate of step (a) in a reaction vessel;

c) purging the reaction vessel of step (b) by heating said vessel to a temperature between 500° C. and 750° C. while introducing a gaseous mixture of hydrogen and an inert gas;

d) growing a carbon nanotube core by changing the gaseous mixture of step (c) to a stream consisting of approximately 10% carbon-containing gas and approximately 90% inert gas, while increasing the temperature of the reaction vessel to a range between 750° C. and 900° C.;

e) growing an integrally attached graphitic outer layer on the carbon nanotube core of step (d) by changing the reaction parameters to promote the distinct formation of carbon material selected from the group consisting of amorphous carbon, graphitic carbon and mixtures thereof;

f) removing the carbon nanotube with graphitic outer layer of step (e) from the reaction vessel; and g) mechanically breaking away a portion of the graphitic outer layer to leave the carbon nanotube core partially exposed.

2. The manufacturing method of claim 1 wherein the reaction parameters of step (e) are changed to include the steps of:

a) introducing to the reaction vessel a gaseous mixture consisting of approximately 5% carbon-containing gas, approximately 5% hydrogen gas and approximately 90% inert gas while increasing the temperature of the reaction vessel to a range between approximately 900° C. and approximately 1000° C. to promote the growth of an amorphous carbon material;

b) maintaining the conditions of step a) for a period of time from approximately 30 minutes to approximately one hour; and, thereafter c) annealing the reaction product of step (b) by introducing to the reaction vessel a gaseous mixture consisting of approximately 10% carbon-containing gas and approximately 90% inert gas while maintaining the temperature of the reaction vessel at approximately 1000° C. to promote the growth of a graphitic carbon coating.

3. The manufacturing method of claim 1 or 2 wherein the graphitic outer layer forms on the carbon nanotube core at temperatures between approximately 900° C. and approximately 1000° C.

4. The manufacturing method of claim 1 wherein the reaction parameters of step (e) are changed to include the step of annealing the reaction product of step (d) by changing the gaseous mixture to a stream consisting of approximately 10% carbon-containing gas and approximately 90% inert gas while maintaining the temperature of the reaction vessel at approximately 1000° C. to promote the growth of a graphitic carbon coating.

5. The manufacturing method of claim 1 or 4, wherein the graphitic outer layer forms on the carbon nanotube core at temperatures of approximately 1000° C.

6. The manufacturing method of claim 1, 2 or 4 wherein the transition metal catalyst is selected from the group consisting of cobalt, nickel, iron, mixtures and alloys thereof.

7. The manufacturing method of claim 6 wherein the transition metal catalyst is a mixture of 50% iron and 50% nickel.

8. The manufacturing method of claim 1, 2 or 4 wherein the selected substrate for the transition metal catalyst is silicon.

9. The manufacturing method of claim 1, 2 or 4 wherein the inert gas is selected from a group consisting of argon, helium and nitrogen.

10. The manufacturing method of claim 9 wherein the inert gas is argon.

11. The manufacturing method of claim 1, 2 or 4 wherein the carbon-containing gas is selected from the group consisting of methane, ethane, propane, butane, ethylene, cyclohexane, carbon monoxide and carbon dioxide.

12. The manufacturing method of claim 11 wherein the carbon-containing gas is methane.

13. The manufacturing method of claim 1, 2 or 4 wherein purging of the reaction vessel of step (c) occurs when the vessel is heated to a temperature of approximately 725° C.

14. The manufacturing method of claim 1, 2 or 4 wherein the carbon nanotube core grows when the reaction vessel is heated to temperatures of approximately 750° C. and approximately 900° C.

* * * * *